(No Model.) 3 Sheets—Sheet 1.
I. P. CADMAN.
CLOTH WINDING AND MEASURING MACHINE.
No. 558,895. Patented Apr. 21, 1896.
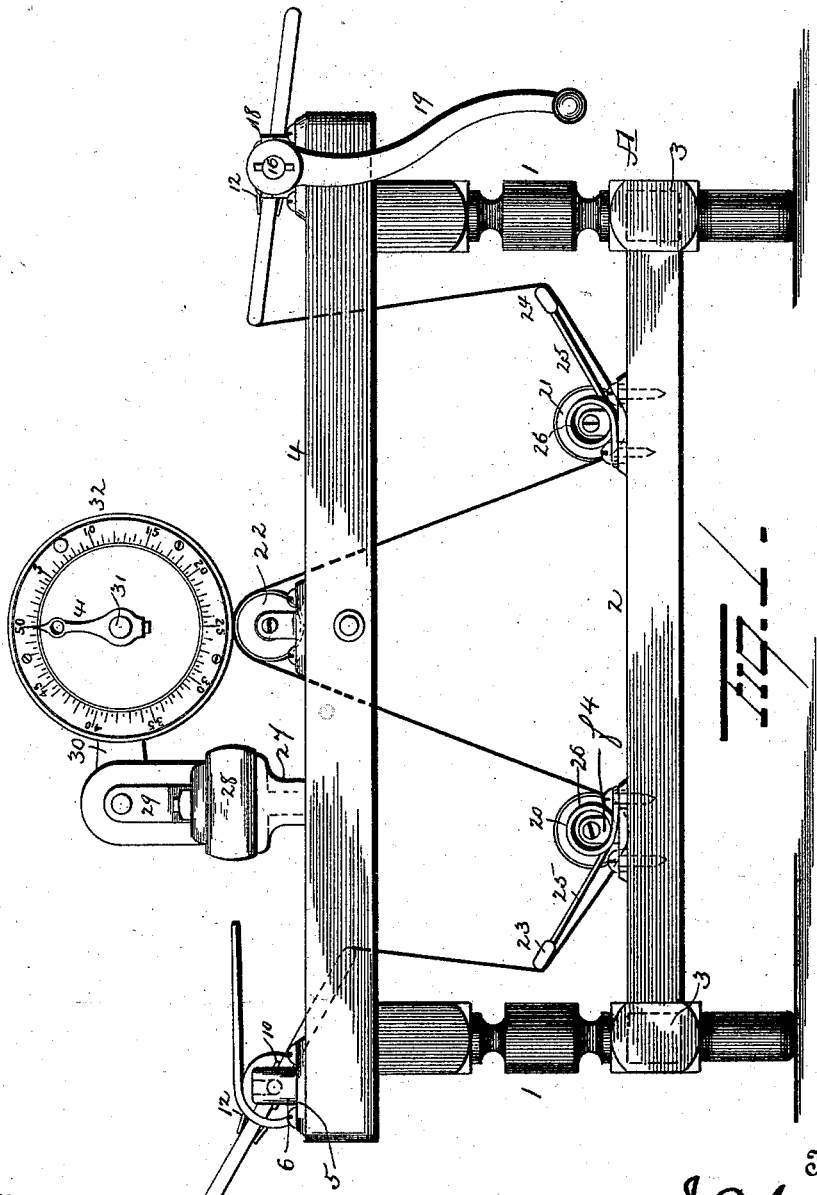
Witnesses
E. J. Nottingham
G. F. Downing
Inventor
I. P. Cadman
By H. A. Seymour
Attorney (No Model.) 3 Sheets—Sheet 2.
I. P. CADMAN.
CLOTH WINDING AND MEASURING MACHINE.
No. 558,895. Patented Apr. 21, 1896.
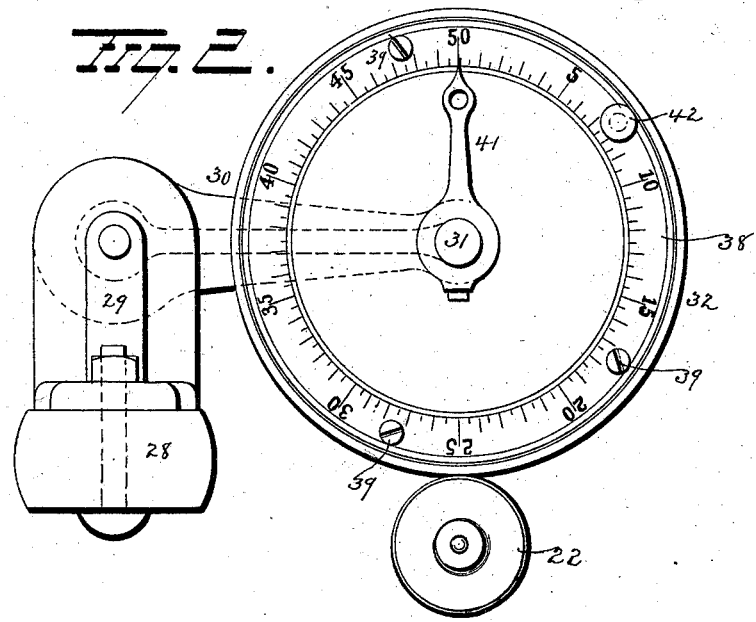
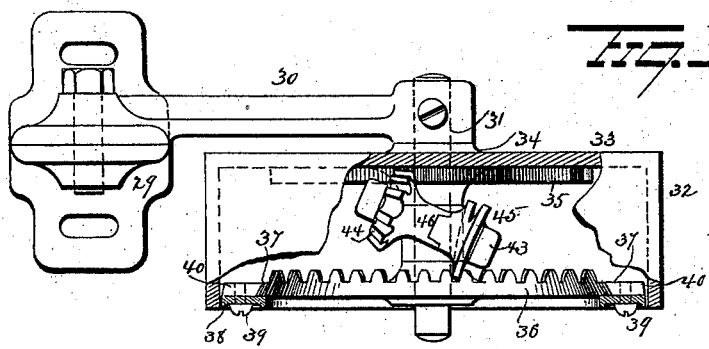
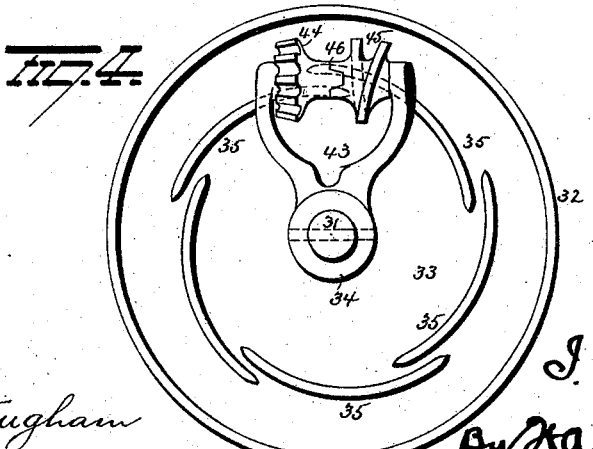
Witnesses
G. J. Nottingham
G. F. Downing
Inventor
I. P. Cadman
By H. A. Seymour
Attorney

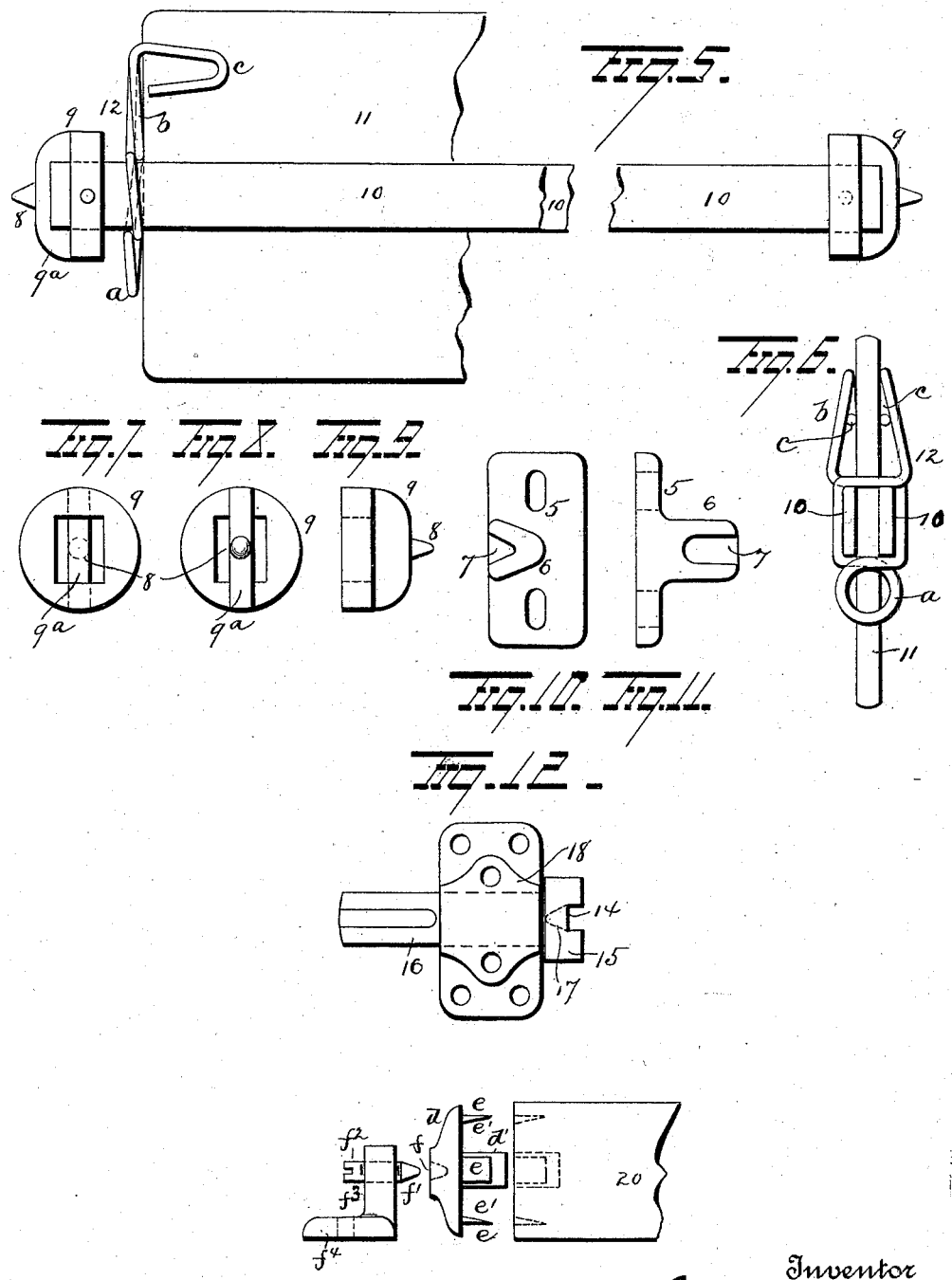

UNITED STATES PATENT OFFICE.

ISAAC P. CADMAN, OF BELOIT, WISCONSIN.

CLOTH WINDING AND MEASURING MACHINE.

SPECIFICATION forming part of Letters Patent No. 558,895, dated April 21, 1896.

Application filed July 25, 1895. Serial No. 557,124. (No model.)

*To all whom it may concern:*

Be it known that I, ISAAC P. CADMAN, of Beloit, in the county of Rock and State of Wisconsin, have invented certain new and useful Improvements in Cloth Winding and Measuring Machines; and I do hereby declare the following to be a full, clear, and exact description of the invention, such as will enable others skilled in the art to which it appertains to make and use the same.

My invention relates to an improvement in machines for winding and measuring cloth, the object of the invention being to provide simple and efficient means for winding cloth evenly from one bolt or core to another and accurately measuring the cloth during its passage through the machine.

A further object is to produce means for winding and measuring cloth which shall comprise a comparatively small number of parts not liable to get out of order, which can be easily operated and controlled, and which shall be effectual in every respect in the performance of their functions.

With these objects in view the invention consists in certain novel features of construction and combinations and arrangements of parts, as hereinafter set forth, and pointed out in the claims.

In the accompanying drawings, Figure 1 is a view of my improved machine. Fig. 2 is an enlarged face view of the indicator. Fig. 3 is a plan view of the indicator, partly broken away; Fig. 4, a view of the indicator with the gear-plate and dial removed. Figs. 5 to 13 are detail views.

A represents a frame comprising a series of posts 1, bottom side rails 2, end rails 3 and top side or cap rails 4. On the cap-rails 4, at one end thereof, brackets 5 are secured and provided with posts or uprights 6, having V-shaped recesses 7, the bottoms of said recesses being curved to serve as bearings for conical projections 8 on caps or clips 9. Each cap or clip is adapted for the reception of the ends of steel temple plates or bars 10, between which the board or core 11 of a bolt of cloth to be measured is disposed. In order to cause the plates 10 to properly clamp the board or core 11 and prevent the latter from slipping, I employ a spring 12, (preferably at both ends of said board or core,) so constructed that it will encircle the plates 10 near their ends and be adaptable for boards of different thicknesses. In constructing this spring-clamp, the wire is first bent to form a loop $a$. The wire is then crossed and made to surround the clamping or temple plates 10. After encircling the bars or plates 10 the ends of the wire of the clamping-spring are extended laterally beyond the plane of the bars or plates 10 and then bent upwardly to form arms $b$, said arms being bent toward each other and terminating in loops $c$, which engage the respective faces of the board or core 11. At the opposite ends of the cap-rails 4, temple plates or bars 10 are disposed and adapted to clamp, in the manner above explained, the board or core on which the cloth is to be wound. At one end the temple plates or bars 10 are connected with a cap and mounted in a bearing on one of the cap-rails, the construction of which parts are identical with corresponding parts at the other end of the machine, as above explained. A cap 9, similar to those above described, is connected with the opposite ends of the temple plates or bars 13, and the cross-bar $9^a$ of this cap is adapted to enter a recess 14, Fig. 12, made in the end of a plate 15, carried by a short shaft 16, and said plate is also made with a conical recess 17 for the reception of the conical projection 8 on the cap or clip 9. The shaft 16 is mounted in a suitable journal-box 18, secured to one of the cap-rails, and is provided with a crank-arm 19 by means of which to turn it. By making the bearings for the caps 9 V-shaped the bolts of cloth can be readily placed in position or removed. If desired, one of the temple-plates of each pair may be secured to the caps 9 at the respective ends thereof.

Rollers 20 21 are disposed near the respective ends of the frame of the machine and have their bearings in brackets on the bottom side rails, and between said rollers 20 21 a roller 22 is mounted in bearings on the top or cap rails. These rollers are preferably made of wood, and to provide simple and efficient means for mounting them I employ the devices shown in figures of the drawings. Each roller is provided at its respective ends with a cap $d$, Fig. 13, having a gudgeon $e$ at the center adapted to enter a socket or recess in the end of the roller. Each cap $d$ is also provided with a series of teeth or dogs $e$, having beveled faces $e'$, which, when they are driven into the end of the roller, tend to compress the wood toward the center without splitting the roller. Each cap $d$ is preferably enlarged at its center and made in its outer face with a conical recess $f$ for the reception of the conical end $f'$ of a screw $f^2$, which latter is passed transversely through an upright or projection $f^3$ on a bracket $f^4$, secured to the side bars of the frame, said screws serving to revolubly support the rollers.

The cloth passes from the bolt of cloth supported by the temple plates or bars 10 under the roller 20, then over the roller 22, then under the roller 21, and is finally wound on the board or core held by the temple plates or bars 13 at the opposite end of the machine. It is important that the cloth be kept taut as it passes through the machine and that it be also kept smooth and straight. For this purpose I provide two presser-bars 23 24, the former being adapted to bear against the cloth between the supply-bolt and the roller 20 and the other bearing against the cloth between the receiving-bolt and the roller 21. The bars 23 24 are pressed against the cloth with the proper tension by means of springs 25, said springs being secured at one end to the respective ends of the presser-bars and at their other ends to the side bars or rails 2 of the frame or to the brackets on said bars and are preferably made with coils 26 between their ends. To the cap-rails 4 4, at points near the roller 22, brackets 27 are secured, and to said brackets a transverse bar 28 is fixed.

Between the ends of the transverse bar 28 a bracket or casting 29 is secured, and to said bracket or casting a laterally-projecting arm 30 is pivotally connected and adapted to terminate immediately over the roller 22. A spindle 31 is secured to the free end of the pivoted arm 30, said spindle being normally disposed parallel with the axis of the roller 22 and serving as a bearing for a measuring-drum 32, adapted to make contact with the cloth passing over the roller 22 and be actuated by the movement of the same. The measuring-drum is made in the form of an annular box, and its bottom or back 33 is made with a hub 34, loosely mounted on the spindle 31. On the inner face of the back or web 33 of the drum an annular series of cams 35 is made. A gear or toothed plate 36 is mounted loosely on the shaft or spindle 31 in proximity to the open end of the drum 32, and the periphery of this toothed plate is preferably beveled, as at 37.

A ring 38, having figures indicating yards and fractions of yards thereon, is placed against the peripheral edge of the gear-plate and held in place by means of a series of screws 39, adapted to enter small blocks 40 on the under side of said ring, said blocks being beveled on one edge and adapted to engage the beveled edge of the gear-plate. A hand or pointer 41 is secured to the end of the spindle 31 and adapted to register with the figures on the ring 38, and the latter is provided with a thumb-screw 42 for releasing the measuring-drum and parts carried thereby from said index-finger.

A forked arm or carrier 43 is located within the drum 32 and secured at one end to the spindle 31. In the forked end of the carrier 43 a bevel-pinion 44 and a conical worm 45 are mounted and connected together by means of clutch-teeth 46.

The carrier 43 is so shaped that the pinion 44 and worm 45 will be disposed in a diagonal position, so that the pinion will mesh with and receive motion from the cams 35 as the drum is rotated, and so that the worm 45 will mesh with the teeth of the toothed or gear plate 35 and transmit motion thereto, thus causing said toothed plate and the index-ring carried thereby to rotate relatively to the index-finger, and thus cause the index-finger to register on the index-ring the amount of cloth which shall have passed over the roller 22.

My improvements are very simple in construction, comparatively cheap to construct, not liable to get out of order, and are effectual and accurate in the performance of their functions of winding and measuring cloth.

Various slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a cloth-winding machine, the combination with a frame and bearings thereon, of temple plates or bars adapted to receive a board or core between them, caps at the respective ends of the temple-plates mounted in said bearings, and spring-clamps constructed to engage both temple-plates and board or core and clamp them to the board or core, substantially as set forth.

2. In a cloth-winding machine, the combination with a frame and bearings thereon, of temple plates or bars adapted to receive a board or core between them, caps at the respective ends of the temple-plates mounted in said bearings, and spring-clamps adapted to embrace said temple-plates and clamp them to the board or core, said spring-clamps having spring-arms adapted to grasp said board or core, substantially as set forth.

3. In a machine for winding and measuring cloth, the combination with a frame, a roller and means for passing cloth over said roller, of a pivoted arm, a spindle at the free end of said arm, a drum mounted on said spindle and adapted to bear on the cloth passing over said roller, a series of cams within said drum, a toothed plate mounted loosely on said spindle, an index-ring carried by said toothed plate, an index-finger secured to the spindle and adapted to register with the figures on the index-ring, a forked arm or carrier secured to the spindle, within the drum, a bevel-pinion at one end of said forked arm or carrier and adapted to receive motion from said cams, and a worm mounted in said forked arm or carrier and connected with said bevel-gear, said worm meshing with the teeth of the toothed plate and transmitting motion thereto, whereby to cause the index-ring to be rotated and the index-finger to indicate the amount of cloth passed over said roller, substantially as set forth.

4. In a cloth-winding machine, the combination with a roller, of a measuring-drum receiving motion from the roller, said drum having curved cams formed therein, a toothed plate, and a diagonally-disposed spindle having teeth at one end which are engaged by the cams on the drum and a worm at the other end which engages and operates the toothed plate to cause the latter to turn, substantially as set forth.

In testimony whereof I have signed this specification in the presence of two subscribing witnesses.

ISAAC P. CADMAN.

Witnesses:
F. F. LIVERMORE,
J. R. BOOTH.